US008185451B2

(12) United States Patent
Suzuki et al.

(10) Patent No.: US 8,185,451 B2
(45) Date of Patent: May 22, 2012

(54) TURN-AROUND TIME INFORMATION MANAGEMENT SYSTEM, STORAGE MEDIUM, AND TURN-AROUND TIME INFORMATION MANAGEMENT METHOD

(75) Inventors: Junji Suzuki, Shiojiri (JP); Yasuo Shibusawa, Matsumoto (JP); Yasuhiro Oshima, Shiojiri (JP); Satoshi Shimoda, Shiojiri (JP); Hironori Yoshizaki, Matsumoto (JP); Miho Yamazaki, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 1049 days.

(21) Appl. No.: 12/003,015

(22) Filed: Dec. 19, 2007

(65) Prior Publication Data

US 2008/0109328 A1 May 8, 2008

Related U.S. Application Data

(62) Division of application No. 09/945,828, filed on Sep. 5, 2001, now Pat. No. 7,337,131.

(30) Foreign Application Priority Data

Sep. 7, 2000 (JP) .................................. 2000-271589

(51) Int. Cl.
*G06F 17/30* (2006.01)

(52) U.S. Cl. ........................................ 705/27.1; 705/22
(58) Field of Classification Search .................. 705/26.1, 705/27.1, 22
See application file for complete search history.

(56) References Cited

U.S. PATENT DOCUMENTS

| 5,897,620 | A | | 4/1999 | Walker et al. |
| 5,946,210 | A | | 8/1999 | Montminy et al. |
| 6,038,597 | A | * | 3/2000 | Van Wyngarden ............ 709/219 |
| 6,167,383 | A | * | 12/2000 | Henson ........................ 705/26.5 |

(Continued)

FOREIGN PATENT DOCUMENTS

JP A-4-3250 1/1992

(Continued)

OTHER PUBLICATIONS

Tyworth, John, "A note on solutions to the the, Q, r> inventory model for gamma lead-time demand", International Jounal of Physical Distribution & Logistics Management, Circa 2000.*

(Continued)

*Primary Examiner* — Mark Fadok
(74) *Attorney, Agent, or Firm* — Oliff & Berridge, PLC

(57) ABSTRACT

An order data obtaining device displays a list of components on a Web page, and recognizes components selected on the Web page, thereby obtaining order data of a product that is formed of a plurality of components. A turnaround time display control device obtains turn-around time information of each of the components selected on the Web page, and displays on the Web page the longest turn-around time in the turn-around time information as a turn-around time of the product. An accurate turn-around time is calculated in accordance with the selection of components, and a customer is immediately notified of the accurate turn-around time of the product. Thus, loss of competitiveness in the market due to display of a turn-around time being fixed and too long because of its inclusion of leeway is prevented. In addition, since an accurate turn-around time notification is immediately provided to the customer, customer notification of the turn-around time and handling of queries over the phone regarding turn-around time can be reduced, thereby reducing management cost.

8 Claims, 5 Drawing Sheets

U.S. PATENT DOCUMENTS

| | | | |
|---|---|---|---|
| 6,321,262 B1 * | 11/2001 | Springer | 709/223 |
| 6,330,542 B1 | 12/2001 | Sevoik et al. | |
| 6,405,308 B1 | 6/2002 | Gupta et al. | |
| 6,711,149 B1 | 3/2004 | Yano et al. | |
| 6,842,746 B1 | 1/2005 | Kauffman et al. | |
| 7,016,864 B1 * | 3/2006 | Notz et al. | 705/26.5 |
| 7,035,815 B1 | 4/2006 | Henson | |
| 7,039,602 B1 | 5/2006 | Kapadia et al. | |
| 2002/0072986 A1 * | 6/2002 | Aram | 705/26 |

FOREIGN PATENT DOCUMENTS

| | | |
|---|---|---|
| JP | A-4-77861 | 3/1992 |
| JP | A 11-312197 | 11/1999 |
| JP | A 2000-057214 | 2/2000 |
| JP | A-2000-190175 | 7/2000 |
| JP | A 2001-256381 | 9/2001 |
| JP | A 2001-344443 | 12/2001 |
| WO | WO 99/45450 | 9/1999 |

OTHER PUBLICATIONS

Snyder et al, "Lead time demand for simple exponencial smoothing: an adjustment factor for the standard deviation", Journal of the Operational Reasearch Society, 1999.*

Fong et al, "Estimating moments of the effective lead time for a stock control mode with independent normal lead times", Journal of the Operational Reasearch Society, Mar. 1993.*

Locus Mook, "Let's Try Online Shopping and Auction!," First Edition, Jun. 25, 2000, pp. 19-25; Locus Co., Japan.

* cited by examiner

TURN-AROUND TIME INFORMATION MANAGEMENT SYSTEM, STORAGE MEDIUM, AND TURN-AROUND TIME INFORMATION MANAGEMENT METHOD

CROSS-REFERENCE TO RELATED APPLICATIONS

This is a Divisional of application Ser. No. 09/945,828 filed Sep. 5, 2001. The disclosure of the prior application is hereby incorporated by reference herein in its entirety.

BACKGROUND

1. Field of the Invention

The present invention relates to a turn-around time information management system, a storage medium, and a turn-around time information management method for specifically and quickly notifying a customer of a turn-around time of a product.

2. Description of Related Art

Generally, when an order of a product is received, the customer is notified of the price and the turn-around time for delivery of the product to the customer. When the product is available in stock, the turn-around time can be accurately calculated based on the shipping arrangement period. Even if the product is not available in stock, as long as all of the components required for manufacturing the product are available in the warehouse, the turn-around time can be calculated relatively accurately based on the manufacturing schedule of the product on the manufacturing line.

However, if the product is not available in stock or if any of the components for assembling the product is not available in stock, it is not easy to notify the customer of an accurate turn-around time. For example, when selling personal computers via the Internet, in order to enable the customer to determine the specifications in detail, a list of components is provided to prompt selection of components, and a total price is calculated and an estimated price and turn-around time are displayed. In this case, the longest turn-around time of the product, which has been calculated in advance, is displayed to notify the customer, for example, that the product will be delivered within ten days.

The conventional art described is subjected to the following problems.

If the turn-around time of which the customer is notified is inaccurate, more queries will be made from the customer, resulting in loss of trust. Thus, when the turn-around time is displayed on a Web page as described above, a turn-around time is displayed that includes a certain amount of leeway. However, considering that the turn-around time will be compared with that of products of other companies, displaying a turn-around time with too much leeway is not desirable from the perspective of sales strategy.

Meanwhile, if it is found, after the confirmation of an order, that some of the components are not available in stock and that the turn-around time will be longer than the turn-around time of which the customer has originally been notified with consideration of the schedule of receiving the components, the customer is notified of an accurate turn-around time, for example, over the phone. That is, operators in charge of receiving orders must perform various jobs, including changing turn-around times and handling queries from customers. The load associated with such jobs has been considerably large and has increased sales costs.

For example, when products are sold on a Web page over the Internet, sales costs for exhibiting the products at shops, selling the products to the customers, and explaining the products to the customers can be significantly reduced. However, if a need for frequent queries regarding turn-around times and for notification of turn-around times arises as described above, the advantages of network-based sales will be reduced or lost.

SUMMARY

The present invention employs the following schemes to address the above problems.

<Scheme 1>

A turn-around time information management system includes an order data obtaining device that obtains order data of a product, formed of a plurality of components, by showing a list of components on a Web page and recognizing components selected on the Web page; and a turn-around time display control device that obtains turn-around time information of each of the components selected on the Web page and displays, on the Web page, the longest turn-around time in the turn-around time information as a turn-around time of the product.

The Web page displays a list of components required to satisfy an order of a product, and the customer makes selections. The Web page may display other arbitrary information. Furthermore, the list of components and the turn-around time may be displayed separately on a plurality of Web pages instead of on a single Web page. The turn-around time information may include at least, for example, data indicating how many days, from the date of the order, is required for the delivery of the product to the customer. Any method of displaying the turn-around time can be used.

<Scheme 2>

The turn-around time information management system according to Scheme 1 can be provided such that, when a predetermined turn-around time of the product is longer than the longest turn-around time in the turn-around time information of each of the components, the turn-around time display control device displays, on the Web page, the predetermined turn-around time of the product as the turn-around time of the product.

The shortest turn-around time is the predetermined turn-around time of the product, and only when some of the components make the turn-around time to be longer, the turn-around time of the components overrides the predetermined turn-around time. This feature is suitable in a case where factors other than the turn-around time of components are involved in the turn-around time of a product.

<Scheme 3>

The turn-around time information management system according to Scheme 1 can be provided such that the turn-around time display control device displays, on the Web page, the component with the longest turn-around time which determined the turn-around time of the product.

In order to notify the customer of the cause of the turn-around time being longer, the component with the longest turn-around time is displayed. When the customer changes selection of the component, the turn-around time is also changed automatically.

<Scheme 4>

The turn-around time information management system according to Scheme 1 can be provided such that the turn-around time display control device displays components with long turn-around times, including the component with the longest turn-around time which determined the turn-around time of the product.

By displaying a plurality of components with long turn-around times that causes the turn-around time to be longer, the customer can readily reselect components. Whether a turn-around time is long or not may be determined by predetermined criteria.

<Scheme 5>

The turn-around time information management system according to Scheme 1 can be provided such that the turn-around time display control device includes a device that inputs a desired turn-around time, so that components with turn-around times that are longer than the desired turn-around time are displayed on the Web page.

Any device that inputs a desired turn-around time can be used. For example, if n days is input as the desired turn-around time, with reference to the turn-around time information of all of the selected components, components with turn-around times of n days or longer, longer than the desired turn-around time, are extracted and displayed on the Web page. This feature readily enables the customer to determine whether to change the desired turn-around time or to change the selection of components.

<Scheme 6>

The turn-around time information management system according to Scheme 1 can be provided such that the turn-around time display control device includes a device that inputs a desired turn-around time so as to implement display on the Web page that restricts selection of components with turn-around times that are longer than the desired turn-around time.

The display is controlled so that selection of components with long turn-around times is restricted, and priority will be given to the desired turn-around time. Any method of restricting the selection can be used.

<Scheme 7>

The turn-around time information management system according to Scheme 1 can be provided such that the turn-around time display control device displays, on the Web page, turn-around time information of all of the components that are available for selection on a component selection screen.

By displaying the turn-around time of all of the components on the component selection screen, the customer can select components by considering the price and the turn-around time of the components.

<Scheme 8>

A turn-around time information management system in accordance with another scheme includes: an order data obtaining device that obtains order data of a product, formed of a plurality of components, by showing a list of components on a Web page and recognizing components selected on the Web page; and a turn-around time display control device that displays a predetermined standard turn-around time when the number of each of the components in stock selected on the Web page is greater than or equal to a threshold value, while displaying a message to the effect that the turn-around time will be longer than the standard turn-around time when the number of any of the components in stock selected on the Web page does not reach the threshold value.

The standard turn-around time is displayed if the number of each of the components in stock is greater than or equal to the threshold value. The threshold value and the standard turn-around time may be set arbitrarily. When the number of any of the components in stock selected on the Web page does not reach the threshold value, the turn-around time will be longer than the standard turn-around time, and thus a message to that effect is displayed. Any display method can be used. This can be considered to be the simplest turn-around time display method of the above examples.

<Scheme 9>

A computer-readable storage medium stores a computer program for executing the process of displaying a list of components on a Web page; the process of obtaining order data of a product, formed of a plurality of components, by recognizing components selected on the Web page; and the process of obtaining turn-around time information of each of the components that are selected on the Web page and displaying, on the Web page, the longest turn-around time in the turn-around time information as the turn-around time of the product.

Implementing the scheme by a computer provides the same operation as Scheme 1. That is, the Web page displays a list of components required to satisfy an order of a product, and the customer makes selections. The Web page may display other arbitrary information. Furthermore, the list of components and the turn-around time may be displayed separately on a plurality of Web pages instead of on a single Web page. The turn-around time information may include at least, for example, data indicating how many days from the date of the order is required for the delivery of the product to the customer. Any method of displaying the turn-around time can be used.

<Scheme 10>

A turn-around time information management method includes: displaying a list of components on a Web page; obtaining order data of a product, formed of a plurality of components, by recognizing components selected on the Web page; and obtaining turn-around time information of each of the components that are selected on the Web page and displaying, on the Web page, the longest turn-around time in the turn-around time information as the turn-around time of the product.

Similarly to Scheme 1, the Web page displays a list of components that are required to satisfy an order of a product, and the customer makes selections. The Web page may display other arbitrary information. Furthermore, the list of components and the turn-around time may be displayed separately on a plurality of Web pages instead of on a single Web page. The turn-around time information may include at least, for example, data indicating how many days from the date of the order is required for the delivery of the product to the customer. Any method of displaying the turn-around time can be used.

DETAILED DESCRIPTION OF THE PREFERRED EMBODIMENTS

Various exemplary embodiments of the invention will be described below.

As an example, the following describes a process by which a personal computer is purchased via the Internet.

Figure 1:
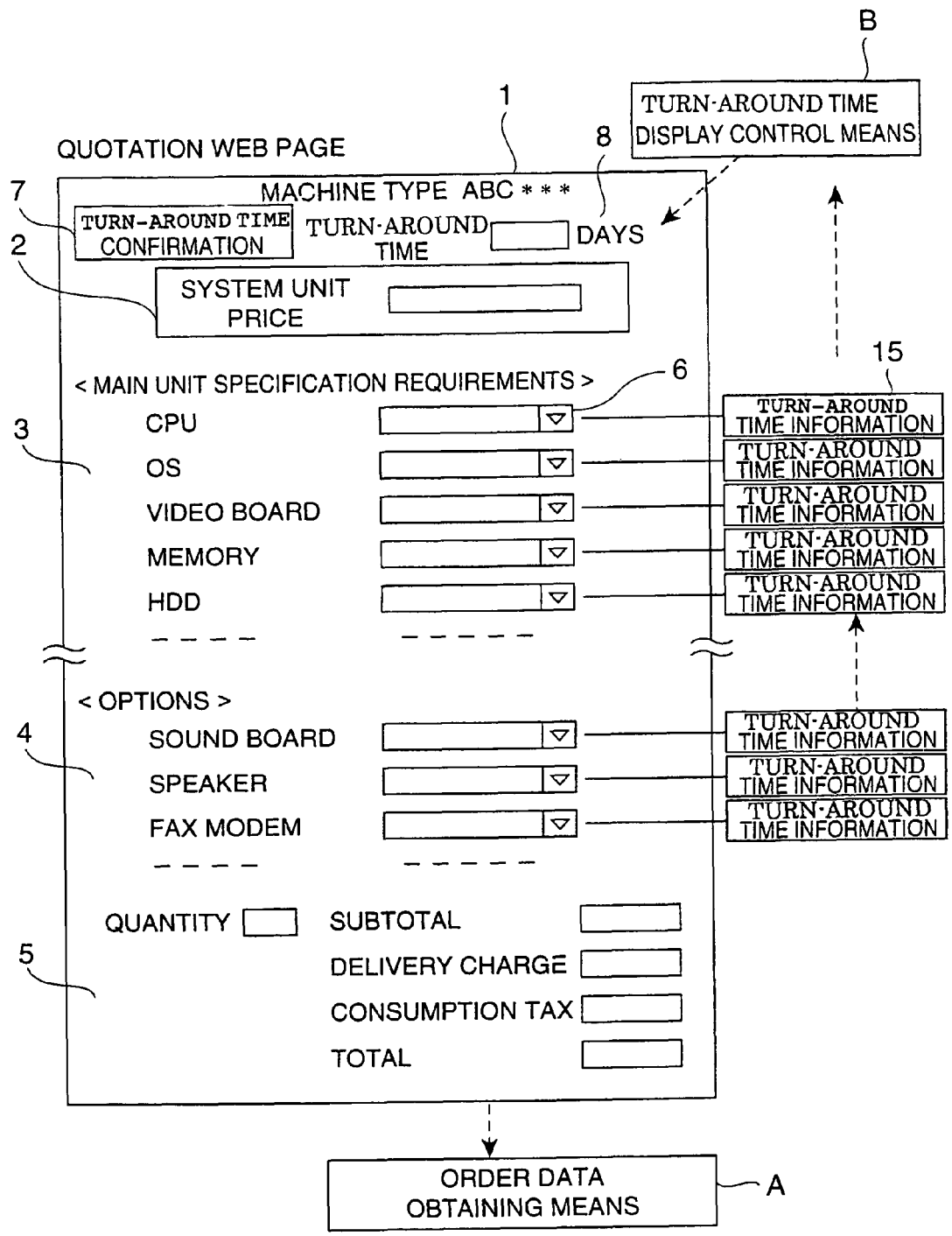
FIG. 1 is a schematic showing an example of a quotation Web page used to purchase a personal computer.

FIG. 1 is a schematic showing an example of a quotation Web page used to purchase a personal computer.

When a terminal that is connected to the Internet is operated to establish a connection with a server to purchase a personal computer, a quotation Web page 1, as shown in FIG. 1, is displayed. The quotation Web page 1 includes, under a machine type displayed at the top, a system unit price display area 2, a main unit specification requirement display area 3, an option display area 4, and a quotation result display area 5. The quotation Web page 1 is used to specifically calculate a cost estimate for purchasing a particular type of machine that is selected by the customer, in this example, a machine type of the name "ABC***", and to display the result in real time for the user.

When the customer selects the type of each component displayed in the main unit specification requirement display area 3 and the option display area 4 using list boxes 6 shown in FIG. 1 with reference to the quotation Web page 1, the unit price of a personal computer, formed of the selected components, is displayed in the system unit price display area 2. The quotation result, including the quantity, is displayed in the quotation result display area 5. When an order is actually placed, an order data obtaining device A obtains the result and uses it for order management.

Quotation Web pages of this kind are widely used for commercial transactions over the Internet. However, the quotation Web page 1 according to the present invention includes a turn-around time display area 8 and a turn-around time confirmation button 7. More specifically, when the components have been selected by using the quotation Web page 1 and the quotation result including the system unit price has been displayed, a specific turn-around time can be displayed in the turn-around time display area 8 by clicking the turn-around time confirmation button 7.

Generally, turn-around time is predefined for each machine type, and is statically displayed. According to the present invention, however, the turn-around time is calculated and displayed in accordance with the selected components. More specifically, turn-around time information 15 is obtained for each of the selected components. The turn-around time information 15 includes data indicating, for example, how many days are required to fix each of the components to the main unit and deliver the product to the customer. The turn-around time information 15 is obtained for all of the components, and a turn-around time display control device B selects the maximum value in the turn-around time information.

In this example, the maximum value in the turn-around time information for all of the components is displayed in the turn-around time display area 8. Thus, the specific turn-around time of a product, which is displayed, is the turn-around time of the component with the longest turn-around time among all of the components selected in the quotation Web page 1. A short turn-around time will be displayed for the product when the turn-around times of all of the selected components are short, while a longer turn-around time will be displayed when even a single component with a longer turn-around time is included.

In order to control the display of the Web page as described above, the following system is employed.

Figure 2:
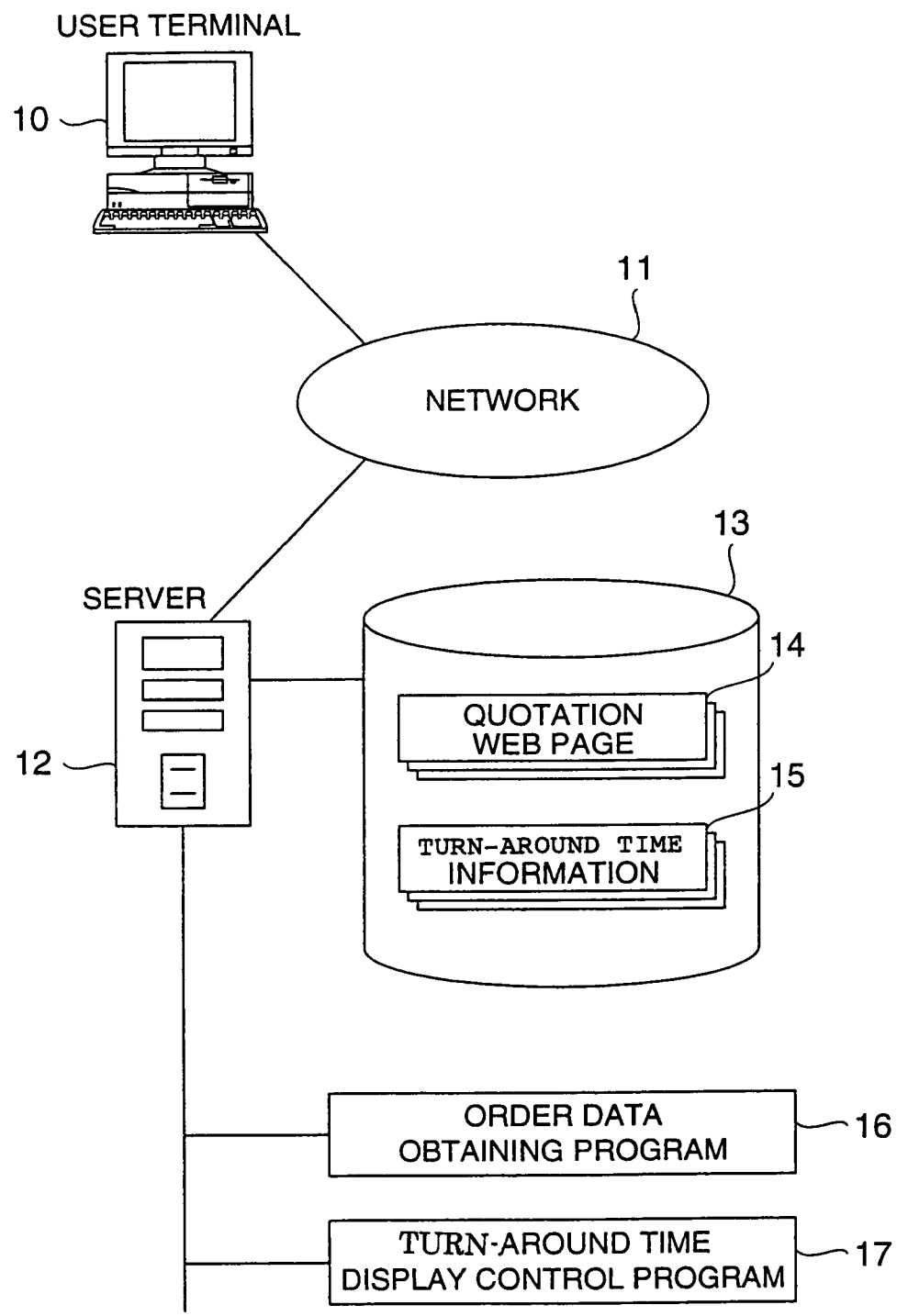
FIG. 2 is a schematic showing an example of turn-around time information management system according to the present invention.

FIG. 2 is a schematic showing a turn-around time information management system according the present invention.

In this system, a user terminal 10 and a server 12 are connected via a network 11 so that the quotation Web page 1, as described above, can be referred. A storage device 13 provided in the server 12, and programs that enable the server 12 to obtain the order data described above and display the turn-around time, are shown as extracted on the right side of the server 12.

The storage device 13 shown in FIG. 2 stores a quotation Web page 14 and the turn-around time information 15. Required types of quotation Web pages 14 are provided when a variety of machine types are available. The turn-around time information 15 includes turn-around time information for all of the components.

The turn-around time information 15 is provided, for example, from a component management center, which is not shown in FIG. 2, and is then stored in the storage device 13. The order data obtaining program 16 corresponds to the order data obtaining device A shown in FIG. 1, and performs a process for displaying the quotation Web page 14 on the user terminal 10 via the network 11, obtaining information regarding the selected components, and receiving the product order.

The turn-around time display control program 17 corresponds to the turn-around time display control device B shown in FIG. 1 and performs a process for obtaining turn-around time information for each of the components, selecting, for example, the maximum value thereof, and displaying the maximum value in the turn-around time display area 8, as described above. An embodiment and modifications of the operation of the turn-around time display control program will be described below with reference to FIGS. 3(a)-3(c).

Figure 3:
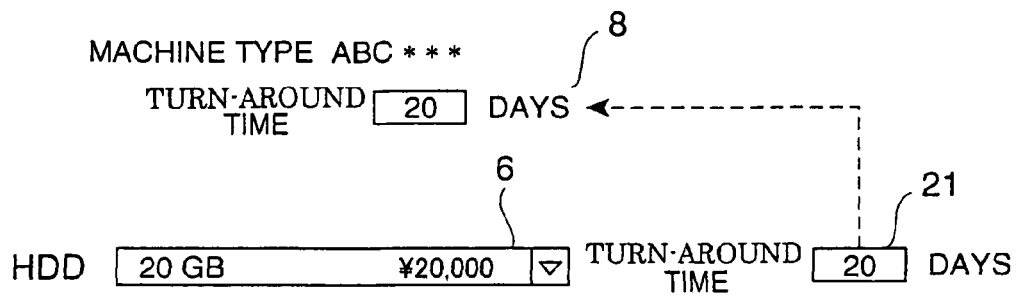
FIGS. 3(a)-3(c) are schematics showing an example of the main portion of the quotation Web page, in which each of FIGS. 3(a)-3(c) show different example operations, respectively.
Figure 3:
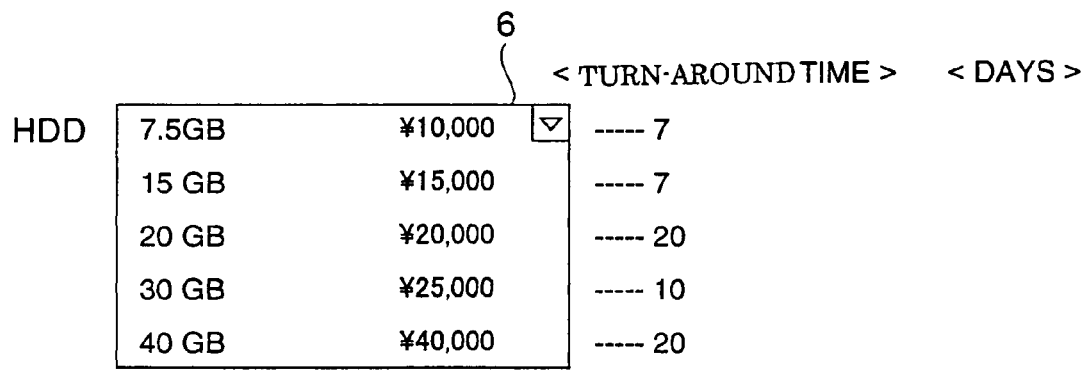
Figure 3:
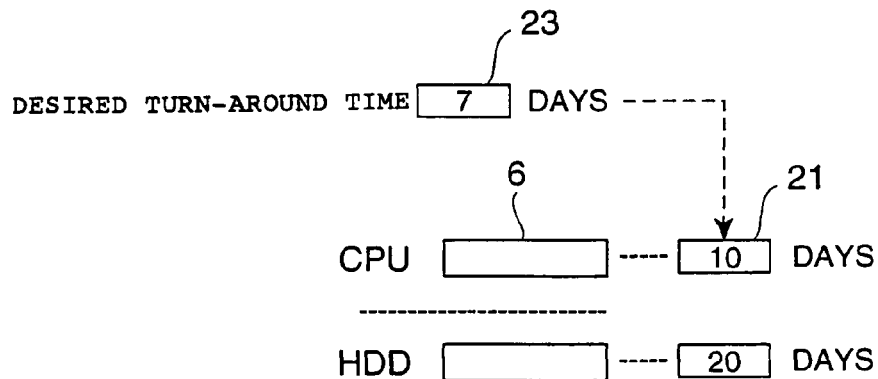

FIGS. 3(a)-3(c) show the main portion of the quotation Web page, in which each of FIGS. 3(a)-3(c) respectively show different example operations.

Referring first to FIG. 3(a), in an example with reference to FIG. 1, for example, when the capacity of HDD is selected from the list box 6 in the main unit specification requirement display area 3, the unit price thereof is displayed, and a quote process is executed. Then, in the example shown in FIG. 1, when the turn-around time confirmation button 7 is clicked, the turn-around time display control program 17 shown in FIG. 2 is executed, so that the turn-around time information 15 of the corresponding components is obtained, and the maximum value is selected. The turn-around time confirmation button 7 need not be provided if the turn-around time is calculated and the result thereof is displayed upon selection of the components.

Since the turn-around time of the product is directly related to the turn-around time of each component, in the example shown in FIG. 3(a), a turn-around time display frame 21 is provided for each component on the right side of the list box 6. More specifically, when a component has been selected, for example, a message indicating that the turn-around time of the HDD is 20 days is displayed therein. In the case that the turn-around time of the HDD coincides with the turn-around time of the product shown in the turn-around time display area 8, the customer recognizes that the turn-around time of the HDD is the longest among all of the components constituting the product. Thus, as will be described below, the customer can select a component with a short turn-around time instead of a component with a long turn-around time, thereby adjusting the turn-around time of the product to fall within the customer's desired turn-around time.

In order to facilitate this type of component selection which takes into account consideration of turn-around time, for example, a turn-around time display method as shown in FIG. 3(b) may be employed. As shown in FIG. 3(b), the list box 6 for HDD is a so-called drop-down list box. Thus, by clicking the triangular mark at the right end, a list of all the HDDs available for selection is displayed. Quote prices are displayed therein, and in addition, on the right side thereof, turn-around times for all of the components are displayed.

That is, the turn-around times of all the components available for selection are displayed directly in value. Thus, the customer is allowed to flexibly choose to select a product with a short turn-around time, or a product with a long turn-around time but that better matches his preference.

In this way, the component with the longest turn-around time among the components selected by the customer is determined, and the turn-around time thereof is displayed directly as the turn-around time of the product, so that the customer can be immediately informed of an accurate turn-around time.

In reality, however, there are cases where the turn-around time of the product cannot be determined by only the turn-around time information of the components. This is because even if all the components are available, a process to push the product into the line to be wrapped and shipped is involved. For this reason, for example, the turn-around time of the product is predetermined as seven days, and if a component with a turn-around time of seven days or longer is included, the turn-around time of the component will be the turn-around time of the product. If no component with a turn-around time of seven days or longer is included, the turn-around time of the product is displayed as seven days.

When the turn-around time of the component with the longest turn-around time is the turn-around time of the product, the customer should at least be notified of the component with the longest turn-around time, and an explanation that the turn-around time is affected thereby should be made. Furthermore, if a list of components with relatively long turn-around times is displayed to the customer during the quote operation, the customer can avoid selecting such components. FIG. 3(b) shows an example of such method. Meanwhile, if a turn-around time that is desired by the customer is known in advance, the customer may be notified of components that do not satisfy the desired turn-around time. FIG. 3(c) shows an example thereof. More specifically, in this example, a desired turn-around time input area 23 for the customer is provided in the quotation Web page 1. If seven days is input as the turn-around time that is desired by the customer, turn-around time display frames 21 are provided on the Web page only for components with turn-around times of seven days or longer and the turn-around times thereof are displayed therein. That is, the customer can select components by only viewing the turn-around time information of the components not satisfying the desired turn-around time without having to view a great deal of turn-around time information.

As an example, selection of HDD in purchasing a personal computer will be considered. Of the following four types of HDDs: "a", "b", "c" and "d", if "a" does not satisfy the desired turn-around time, in the example described above, a message reading "the desired turn-around time will not be satisfied if a is selected" is displayed. As an alternative method, components that are available for selection may be restricted. For example, when a desired turn-around time is input, a component list may be displayed in a manner that prevents the selection of components not satisfying the turn-around time. More specifically, only "b", "c" and "d", which are available for selection with the desired turn-around time, are displayed in the drop-down list. Alternatively, the method may be such that all the components "a", "b", "c" and "d" are displayed in the drop-down list, and when a is selected, a message saying "the component does not satisfy the desired turn-around time" is displayed. Furthermore, for example, a turn-around time information display button may be provided so that the turn-around times of all of "a", "b", "c" and "d" are displayed by clicking the button.

Figure 4:
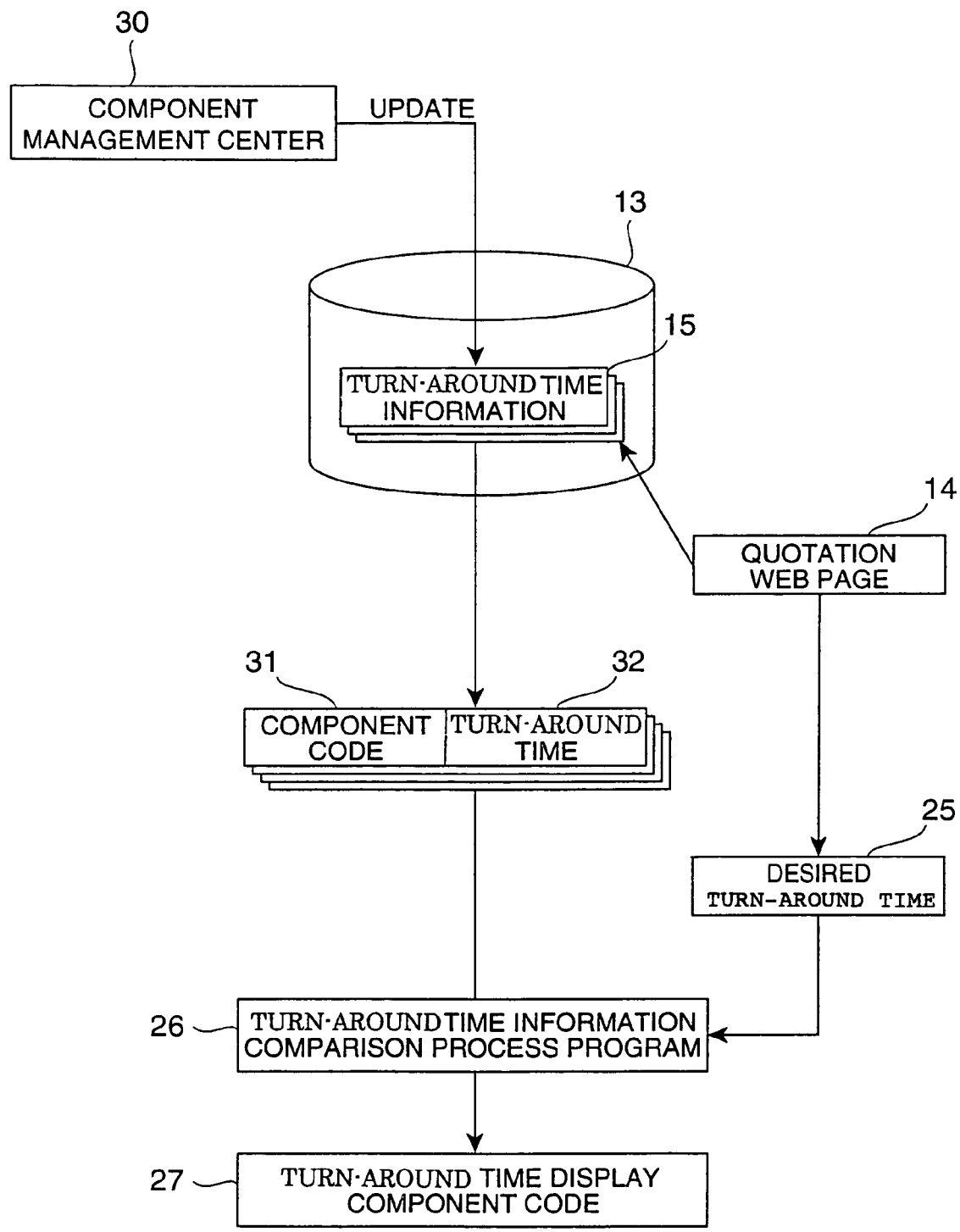
FIG. 4 is a schematic of a specific turn-around time display operation.

FIG. 4 is a schematic showing the specific operation of the turn-around time display as described above.

The storage device 13 is provided in a server. Initially, the latest turn-around time information 15 of components is input to the storage device 13 from a component management center 30. The turn-around time information 15 is continually updated and replaced with the latest information. When the turn-around time display control program 17 shown in FIG. 2 obtains information regarding the components selected in the quotation Web page 14, turn-around time information 15 corresponding thereto is called. As shown in FIG. 4, the turn-around time information 15 is formed of, for example, a component code 31 and a turn-around time 32. When turn-around time information for all of the components has been retrieved, data of a desired turn-around time 25 entered in the quotation Web page 14 is obtained. Then, turn-around times 32 of all the components are compared with the desired turn-around time. A turn-around time information comparison process program 26 shown in FIG. 4 is included in the turn-around time display control program 17. The program extracts the component codes of components with turn-around times 32 that are longer than the desired turn-around time. Then, the component codes are output as turn-around time display component codes 27, which are written into the quotation Web page 14 for display.

By the operation described above, the turn-around time is displayed for the customer as required. Although the quote and the turn-around time are displayed together on a single Web page in the example described above, part of the screen for component selection and the turn-around time may be displayed on separate Web pages.

Figure 5:
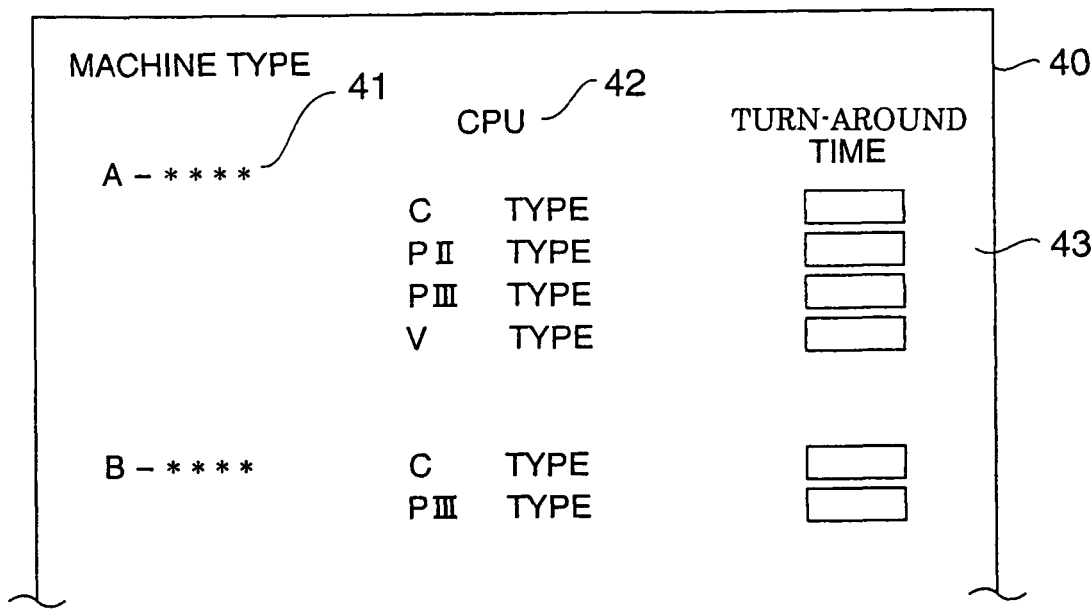
FIG. 5 is a schematic of a machine-by-machine turn-around time information Web page.

FIG. 5 is a schematic of a model-by-model turn-around time information Web page.

A description is provided below of a model-by-model turn-around time information Web page 40 which allows notification of a specific turn-around time for each machine type. The model-by-model turn-around time information Web page 40 includes a machine type display area 41, a component display area 42, and a turn-around time display area 43. The machine type display area 41 displays the machine type of a personal computer. The component display area 42 displays the names of primary components or components which most significantly affect the turn-around time.

In this example, CPUs for each machine type are displayed, and a turn-around time is displayed for each of the CPUs. When an approximate turn-around time is displayed for each machine type as described above, an accurate turn-around time is displayed by the operation of the turn-around time display control program already described.

Generally, the standard turn-around time of a product is determined with consideration of the assembly time for a case where all of the components are sufficient in stock. Thus, for example, if a product, that is formed of only components sufficiently in stock (components with the number of units in stock equal to or greater than a predetermined threshold), is ordered, the customer is notified of the standard turn-around time of the product without performing complex calculations as described above. When a component that is not sufficiently in stock is used, the turn-around time is calculated according to the above-described embodiment, but this requires collection of sufficient basis data.

Thus, while the basis data is being collected or the component procurement system is being altered, an operational measure must be taken to notify the customer of the turn-around time in a simpler manner. Thus, for example, a threshold of the number of units in stock is predetermined for each component. Then, when a product that includes a component with a number of units in stock not greater than the threshold is ordered, a message to the effect that the turn-around time will be longer than the standard turn-around time, such as "the turn-around time will be notified later", is displayed. This allows the standard turn-around time to be directly displayed and the turn-around time to be faithfully observed. When the turn-around time will be longer, the customer is individually notified of the turn-around time, avoiding degradation of customer service.

The order data obtaining program and the turn-around time display control program may be implemented by separate program modules or by an integrated program module. Furthermore, the functional blocks may be partially or entirely implemented in hardware using logic circuits. Furthermore, each program module may be executed as part of an existing application program or as an independent program. A computer program for implementing the present invention as described hereinabove may be stored on a computer-readable storage medium such as a CD-ROM and installed for use.

Alternatively, the computer program may be used by downloading the program into a memory of a computer via a network.

As described hereinabove, according to the present invention, when a product is formed of a plurality of components and the components are selected arbitrarily by the customer, an accurate turn-around time is calculated in accordance with the selected components, and the customer is immediately notified of the accurate turn-around time of the product. Thus, loss of competitiveness in the market due to a turn-around time being fixed and too long because of its inclusion of leeway is prevented. In addition, since an accurate turn-around time notification is sent immediately, customer notification of the turn-around time and the handling of queries over the phone regarding turn-around time can be reduced, thereby reducing management costs. At the same time, since the customer is notified of an accurate and reliable turn-around time, the risk of losing trust in business due to a delayed notification of turn-around time or an unobserved turn-around time is eliminated. Furthermore, since the customer can determine the turn-around time at his discretion by selecting components, network-based sales with a high customer satisfaction can be achieved.

What is claimed is:

1. A turn-around time information management system for use with a Web page, comprising:
   an order data storage device that holds turn-around time information for each of a plurality of components;
   an order data obtaining device that obtains order data of a product that is formed of the plurality of components by showing a list of components on the Web page and recognizing components selected on the Web page; and
   a turn-around time display control device that displays a predetermined standard turn-around time that is determined based on an assumption that all of the selected components are sufficiently in stock and, in the event that a number of any of the components in stock selected on the Web page is less than a threshold value, (1) displays a message indicating that a turn-around time will be longer than the predetermined standard turn-around time, (2) updates the turn-around time based on the turn-around time information for the selected components having the number in stock that is less than the threshold value; and (3) displays the updated turn-around time.

2. The turn-around time information management system according to claim 1, wherein the predetermined standard turn-around time comprises a time required for assembly of the components to form the product and delivery of the product.

3. The turn-around time information management system according to claim 1, wherein after displaying the message indicating that a turn-around time will be longer than the predetermined standard turn-around time, the turn-around time display control device obtains the turn-around time of information of each of the components selected on the Web page and displays on the Web page the longest turn-around time in the turn-around time information as the updated turn-around time.

4. A computer-readable storage medium that stores a computer program for executing processes for:
   holding turn-around time information for each of a plurality of components;
   displaying a list of components on a Web page;
   obtaining order data of a product that is formed of the plurality of components by recognizing components selected on the Web page;
   displaying a predetermined standard turn-around time that is determined based on an assumption that all of the selected components are sufficiently in stock;
   displaying a message indicating that a turn-around time will be longer than the predetermined standard turn-around time when the number of any of the components in stock selected on the Web page is less than the threshold value;
   updating the turn-around time based on the turn-around time information for the selected components having the number in stock that is less than the threshold value; and
   displaying an updated turn-around time.

5. A turn-around time information management method, comprising:
   holding turn-around time information for each of a plurality of components;
   displaying a list of components on a Web page;
   obtaining order data of a product that is formed of the plurality of components by recognizing components selected on the Web page;
   displaying a predetermined standard turn-around time that is determined based on an assumption that all of the selected components are sufficiently in stock;
   displaying a message indicating that a turn-around time will be longer than the predetermined standard turn-around time when the number of any of the components in stock selected on the Web page is less than the threshold value;
   updating the turn-around time based on the turn-around time information for the selected components having the number in stock that is less than the threshold value; and
   displaying an updated turn-around time.

6. A client terminal connected to a server device via a network, the client terminal comprising:
   a display means for displaying a Web page that lists a plurality of components capable of being combined to form a product,
   a communication means for sending order data of the product formed of components selected on the Web Page to the server device, and requesting the server device for turn-around time information of the product, and
   a receiving means (1) for receiving from the server device a predetermined standard turn-around time that is determined based on an assumption that all of the selected components are sufficiently in stock, (2) for receiving from the server device a message indicating that a turn-around time will be longer than the predetermined standard turn-around time when the number of any of the components in stock selected on the Web page is less than the threshold value, and (3) for receiving from the server device an updated turn-around time, wherein the display means displays what is received by the receiving means from the server device.

7. A server device connected to a client terminal via a network, the server device comprising:

a storage device comprising:

a Web page storage portion that stores a Web page that lists a plurality of components capable of being combined to form a product, and a turn-around time information storage portion that stores turn-around time information for each of the plurality of components, and a controller comprising:

an order data obtaining portion that displays the Web page on the client terminal and obtains order data of the product formed from components selected on the Web page; and a turn-around time information obtaining portion that obtains the turn-around time information for each of the selected components and stores the turn-around time information in the turn-around time information storage portion, wherein the controller displays on the client terminal a predetermined standard turn-around time that is determined based on an assumption that all of the selected components are sufficiently in stock, displays a message indicating that a turn-around time will be longer than the predetermined standard turn-around time when the controller determines that the number of any of the components in stock selected on the Web page is less than the threshold value, and displays an updated turn-around time.

8. The turn-around time information management system according to claim 1, wherein the predetermined standard turn-around time is determined based on an estimated assembly time of the selected components and based on the assumption that all of the selected components are sufficiently in stock.

* * * * *